W. HUNTER.
Corn-Planter.

No 63,724.

Patented Apr. 9, 1867.

Witnesses:

Inventor;
Wm Hunter
Per Munn & Co
Attorneys

United States Patent Office.

WILLIAM HUNTER, OF HASTINGS, MINNESOTA.

Letters Patent No. 63,724, dated April 9, 1867.

---

IMPROVEMENT IN CORN-PLANTERS.

---

*The Schedule referred to in these Letters Patent and making part of the same.*

---

TO ALL WHOM IT MAY CONCERN:

Be it known that I, WILLIAM HUNTER, of Hastings, in the county of Dakota, and State of Minnesota, have invented a new and useful Improvement in Corn-Planters; and I do hereby declare that the following is a full, clear, and exact description thereof, which will enable others skilled in the art to make and use the same, reference being had to the accompanying drawings, forming part of this specification, in which—

Similar letters of reference indicate like parts.

The object of this invention is to supply the farmers in the West with a cheap and labor-saving implement for planting corn on the level prairie lands. It consists of a hollow cylinder or roller, made of thick plank, about three feet eight inches in diameter and eight feet long, or long enough to extend over and drop three rows of corn about four feet apart, or to plant three rows of any desired distance apart. Within the hollow roller are placed nine grain hoppers, or dropping boxes, placed in three equidistant rows on the inside periphery of the roller, so that nine hills of corn are planted with every revolution of the roller, suitable slides being provided for closing and opening the grain hoppers to drop the corn at the proper time and distances. Small ploughs are connected with the planter to follow and cover the grain. With this machine one man and a pair of horses can plant from fifteen to twenty acres of corn in a day.

Figure 1:
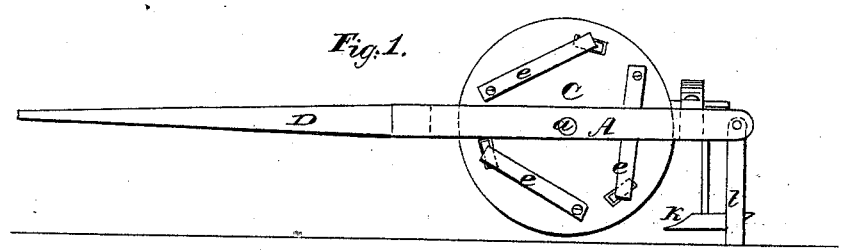
Figures 1 and 2 are opposite end views of the corn-planter.
Figure 2:
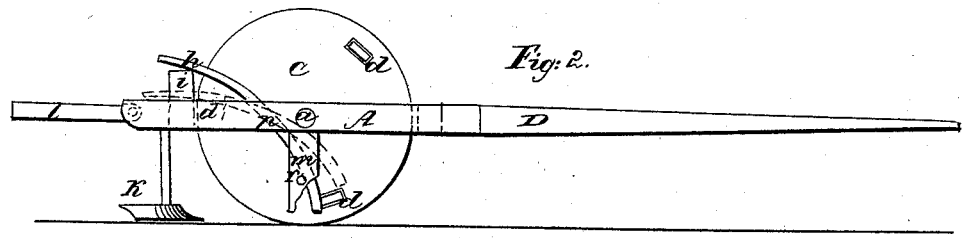
Figure 3:
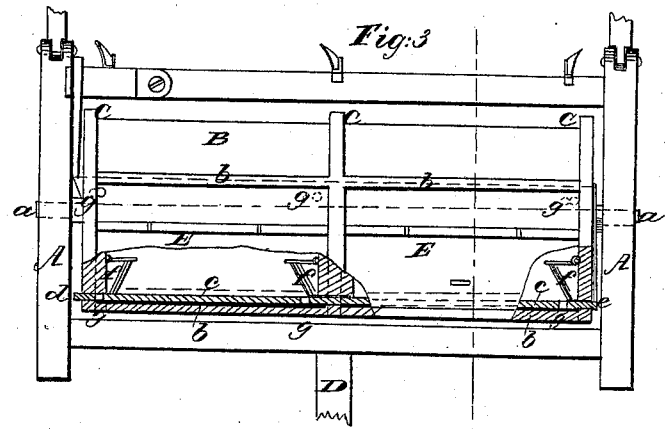
Figure 3 is a top view, with a part of the casing of the cylinder removed to show the grain-dropping arrangement inside.
Figure 4:
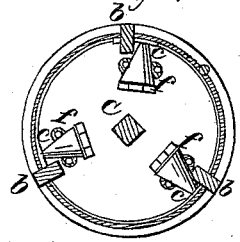
Figure 4 is a cross-section, taken in the line $x\ x$, fig. 3, showing the internal arrangement of the grain droppers.

A is a stout wooden frame, on which the roller B is hung by gudgeons, $a\ a$, at each end. D is a draught pole. C C C are three thick plank wheels, one at each end and one in the middle of the roller, connected by stout plank to form the periphery. The peripheries of the wheels project a little outside of the periphery of the roller to indent and mark the ground to lay off the corn rows. The wheels C C C are also connected by three equidistant ribs, $b\ b\ b$, running longitudinally, and projecting beyond the periphery, flush with the peripheries of the wheels C C C, which also mark the ground. Three slide-bars $c\ c\ c$ lie alongside the ribs $b\ b$ lengthwise, the ends of which pass through both ends or heads of the roller, projecting a little at one end, as seen at $d$, figs. 2 and 3, and bearing against flat springs, $e\ e\ e$, at the other end, shown in fig. 1. Three grain hoppers $f\ f\ f$ are placed over each slide-bar at their junction with the wheels C C C. In the slide-bars are holes, $g\ g\ g$, which come under the nozzles of the hoppers to let the corn drop through when the slides move as the roller revolves. The hoppers have lids to keep the corn from falling out of the top. In figs. 2 and 3 is seen a lever, $h$, which has its fulcrum at $p$ in the frame A, and may be placed so that the lower end comes in contact with the ends of the slide-bars $c\ c\ c$, projecting at $d$, so that as the roller B revolves it shall push the slide-bars in and bring the holes $g\ g\ g$ directly under the hoppers $f\ f\ f$ for the corn to drop through. The ends of the slide-bars are bevelled to allow them to pass under the lever, and when they have passed the springs $e\ e\ e$, at the other end of the roller, force the slide-bars back and close the hoppers. The lever $h$ rests against a pin, $r$, in a projection, $m$, when it is lowered, and may be raised to clear the ends of the slide-bars. It is held in position either when raised or lowered by a button, $i$, which slips over or under the upper end for the purpose. Attached to the frame A, behind the rollers, are placed three small shovel ploughs, $k\ k\ k$, in line with the hoppers, to cover the corn. Two props or legs, $l\ l$, are pivoted to the hind end of the frame A. When the roller is turned around at the end of the row, it is lifted clear of the ground so as to start it right in line with the cross markings; this is done by backing a little till the props $l\ l$ are upright, as shown in fig. 1; at other times they hang and follow the roller, or are set up. Doors, E E, are made to fit in the periphery of the roller on each side of the central wheel C, for the purpose of getting at the hoppers to fill them with grain.

Having thus described my invention, what I claim as new, and desire to secure by Letters Patent, is—

The combination of the hollow cylinder B with the slide-bars $c\ c\ c$, the hoppers $f\ f\ f$, and the lever $h$, constructed and arranged for planting corn substantially as herein described.

WM. HUNTER.

Witnesses:
A. M. HAYES,
C. W. CROSBY.